United States Patent [19]

Gerst

[11] 3,745,250

[45] July 10, 1973

[54] METHOD AND APPARATUS FOR BINARY DATA

[76] Inventor: Carl W. Gerst, Winding Ways, R.D. No. 1, Skaneatles, N.Y.

[22] Filed: Oct. 19, 1971

[21] Appl. No.: 190,489

[52] U.S. Cl. .......................... 178/88, 178/67, 325/30, 325/320, 329/110, 332/16

[51] Int. Cl. .......................................... H04i 15/24

[58] Field of Search ................. 325/13, 38, 43, 321, 325/336, 30, 320; 178/88, 67; 332/9, 21, 22

[56] References Cited

UNITED STATES PATENTS 3,128,343 4/1964 Baker .............................. 325/38 R 3,100,890 8/1963 Henning ............................ 332/21

3,430,143 2/1969 Walker et al. ...................... 325/320

*Primary Examiner*—Howard W. Britton

*Assistant Examiner*—Marc E. Bookbinder

*Attorney*—Hane, Baxley & Spiecens

[57] ABSTRACT

A method of binary data communication is performed by transmitting phase-modulated equal time interval bursts of a carrier signal wherein each of the different possible units of the binary data is represented by a different phase of the carrier signal. When the phase modulated carrier signal is received, units of binary data are generated in accordance with the phase differences in adjacent time intervals of the phase-modulated carrier signal. There is also disclosed various apparatus configurations for realizing the method.

1 Claim, 6 Drawing Figures

DATA TRANSMISSION SYSTEM

Patented July 10, 1973

3,745,250

2 Sheets-Sheet 1

INVENTOR.
CARL W. GERST
BY Hane, Baxley and Spiecens
ATTORNEYS

METHOD AND APPARATUS FOR BINARY DATA

This invention pertains to data communication systems and more particularly to such systems employing modulated carrier signals.

In order to transmit data or even voice signals it has been found that reliability is enhanced by representing the information by binary units of information. It has further been found reliability is enhanced by employing binary-modulated carrier signals. At first the binary information was represented by the presence or absence of a carrier. Thereafter, binary information was represented by shifting between two different frequencies of the carrier, i.e., frequency-shift keying. While frequency-shift keying has obtained wide acceptance, it suffers from several limitations. For example, since two frequencies are involved the communication channel must have a wider passband than those using single frequency carriers. Furthermore, complex circuitry is required to sense for the two frequencies. In addition, since tuned circuits or their equivalents are needed to sense for the frequencies such systems are subject to the drift of the carrier frequency. Furthermore, there are restrictions on the data rates.

It is accordingly, a general object of the invention to provide an improved method of binary data communication utilizing carrier signal modulation techniques which does not have any of the above cited limitations.

Briefly, the invention contemplates a method of binary data communication comprising the steps of phase modulating equal time intervals or multicycle bursts of a carrier signal in accordance with the units of binary data wherein each of the different possible units of the binary data is represented by a different phase of the carrier signal and transmitting such phase-modulated carrier signal. Upon receiving the phase-modulated carrier signal, the binary data is extracted by sensing for the phase differences in the phase-modulated carrier signals in adjacent time intervals.

In addition to this concept the invention specifically contemplates both phase-modulation between two phases and among four orthogonal phases.

Furthermore, subcombinations of the invention are directed to novel modulators and demodulators.

Other objects, features and advantages of the invention will be apparent from the following detailed description when read with the accompanying drawing which shows, by way of example, apparatus for performing the invention.

Figure 1:
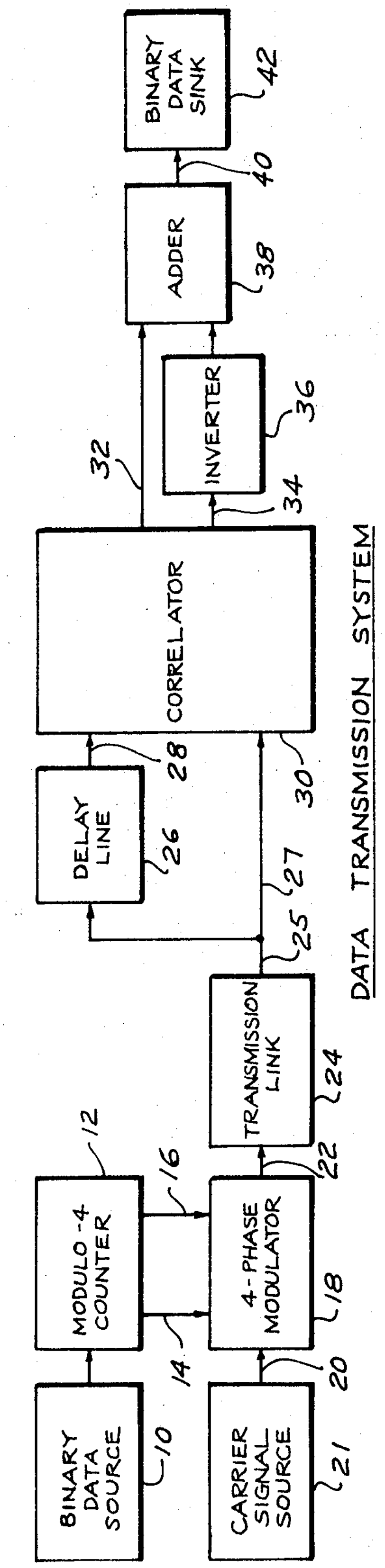
FIG. 1 is a block diagram of a data transmission system employing a four-phase modulated carrier signal.

In FIG. 1 a source of binary data 10 transmits a serial stream of binary data to modulo-4 counter 12. The stream of binary data can be a sequence of pulse-no pulse signals in equal time slots representing respectively, binary "1" and "0". The modulo-4 counter 12 can be two cascaded binary counters with each counter having an output. Such a counter has four unique states and rotationally cycles from state to state each time a binary 1 is received at its input. Accordingly, if the input data stream from source 10 is 0,0,1,0,1,1,0,0,1,0,1 then the binary representations on the outputs of modulo-4 counter 12 are 00,00,01,01,10,11,11,11,00,00,01. The first digit of each pair represents the signal level of the output of the first binary counter which is connected to line 14; and the second digit of each pair represents the signal level of the output of the second binary counter which is connected to line 16. It will be assumed that a binary digit 0 represents a low or negative voltage level and a binary digit 1 represents a high or positive voltage level.

The two outputs of modulo-4 counter 12 are connected via lines 14 and 16 to the modulating signal inputs of four-phase modulator 18 which receives at its carrier signal input a carrier signal via line 20 from carrier signal source 21. Modulator 18 has the property of modulating the phase of the carrier signal to four discrete values 0°, 90°, 180° and 270° dependent on the polarity of equiamplitude pulses received at the modulating signal inputs. For example, if the modulating signal inputs receive the combination 00 the phase is 0°, the combination 01 gives a phase of 90°, the combination 10 gives a phase of 180° and the combination 11 gives a phase of 270°. Thus, when the four-phase modulator 18 serially receives from the modulo-4 counter 12 the following signal combinations 00,00,01,01,10,11,11,11,00,00,01 the phase of the carrier signal sequentially assumes the following values 0°, 0°, 90°, 90°, 180°, 270°, 270°, 270°, 0°, 0°, 90°. The output of modulator 18 is fed via line 22 to transmission link 24 which can include transmitter output amplifiers connected via a transmission path to receive input amplifiers.

The output 25 of transmission link 24 is connected to the receiver which senses for the phase differences between adjacent time slots of the phase-modulated carrier signal. The phase-difference sensing is accomplished by feeding the output 25 of transmission link 24, via line 27, to one input of correlator 30, and also via delay line 26 and line 28 to the second input of correlator 30. Delay line 26 introduces a delay equal to the period of one time slot. Correlator 30 is a device which accepts two coherent RF signals *a* and *b* and provides one output voltage at one output proportional to $ab \sin\theta$ and another output voltage at another output proportional to $ab \cos\theta$, where $\theta$ is the phase difference between RF signals. Therefore, assuming the output 25 of transmission link 24 emits the following sequence of phases of carrier signal in sequential time slots 0°,0°, 90°, 90°, 180°,270°,270°,270°,0°,0°,90°; then, the phase differences presented to correlator 30 are 0°,0°,90°,0°,90°,90°,0°,0° 90°,0°,90°. If output 32 of correlator 30 is the $ab \sin\theta$ output and the output voltage is normalized, then the output voltage pattern will be 0,0,1,0,1,1,0,0,1,0,1. When this pulse train is compared with the pulse train from data source 10 it is seen that the original data has been reproduced. Hence, the output 32 can be the binary data output of the receiver. However, reliability can be enhanced by the following technique. Output 34 which is the $ab \cos\theta$ output of the correlator 30 emits the inverse sequence 1,1,0,1,0,0,1,1,0,1,0. Therefore, when output 34 is connected, via inverter 36, to one input of analog adder 38 and output 32 is connected to the other input of adder 38, the voltage sum of the two signal trains is obtained. Since carrier drift or band rate drift will cause the phase differences to fluctuate, the above-described summing technique minimizes the effect of such fluctuations. The sum output 40 of adder 38 is connected to binary data sink 42 which includes a pulse shaping device such as a Schmitt trigger so that reliably shaped pulse signals are presented to the binary data processing circuits of the data sink 42. Another means for enhancing reliability would be to replace adder 38 by a coincidence circuit.

Although no initial synchronizing means has been shown, it should be apparent that any of the well known techniques presently used in binary data communication, such as prearranged start codes and the like can be employed.

Figure 2:
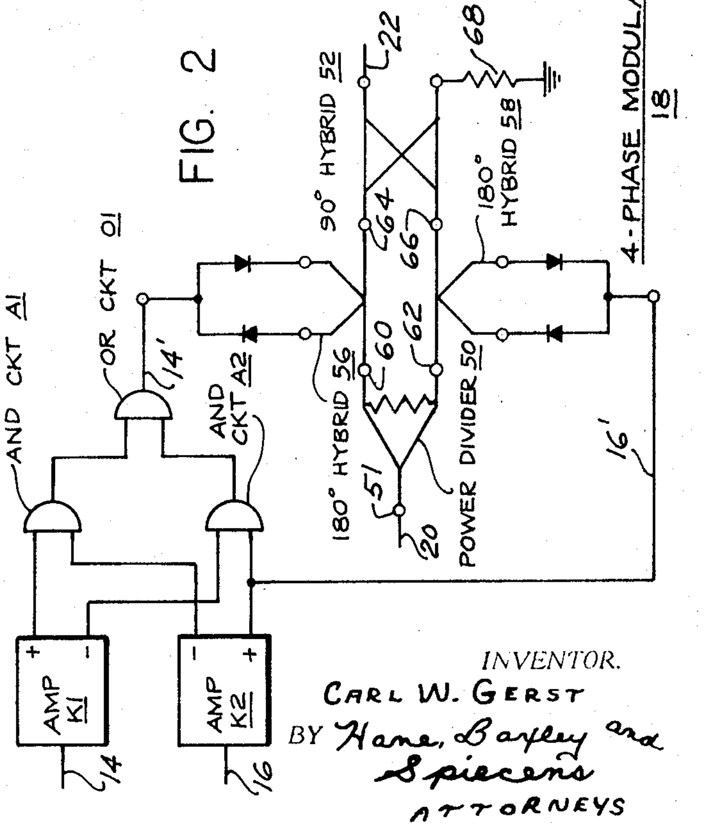
FIG. 2 is a schematic diagram of the four-phase modulator of FIG. 1.

An example of a four-phase modulator 18 is shown in FIG. 2 utilizing a power divider 50, a 90° hybrid 52 and two 180° hybrids 56 and 58.

Although the hybrids are bilateral devices, specific designations will be given to the ports in accordance with signal flow. Carrier signal on line 20 is fed to the input port 51 of power divider 50. Power divider 50 is a well-known device which splits the input power without any relative phase shift to two output parts. The output ports of power divider 50 are connected via junctions 60 and 62 to an input port of each of the 180° hybrids 56 and 58, respectively. An output port of each of the 180° hybrids 56 and 58 is connected via junctions 64 and 66, respectively, to one of the input ports of 90° hybrid 52. One of the output ports of 90° hybrid 52 is terminated with a characteristic impedance 68 while the other output port is connected to line 22. The other two ports of 180° hybrid 56 are connected in parallel via oppositely polarized mixing diodes to one of the modulating signal input lines 14'; and the other two ports of 180° hybrid 58 are connected in parallel via oppositely polarized mixing diodes to the other of the modulating signal input lines 16'. Carrier signal received from line 20 is modulated to one of four different phases, each in a different quadrant, in accordance with one of the four different polarity combinations of the modulating signals on lines 14' and 16' and the phase modulated carrier signal is transmitted to line 22.

Modulator 18 as described up to now does produce the four phases but not cyclically in 90° increments. If the binary combinations are 00,01,10 and 11, then the phases are 0°,90°,270°, and 180°. However, if the input combination 10 is changed to 11, and the input combination 11 changed to 10 the desired cyclicality is obtained. This can be obtained by an algorithm which states that whenever the most significant bit of combination is a 1 invert the least significant bit. The phase splitting amplifiers K1 and K2 driving the logic network comprising AND-circuits A1 and A2 and OR-circuit O1 mechanize this algorithm.

Figure 3:
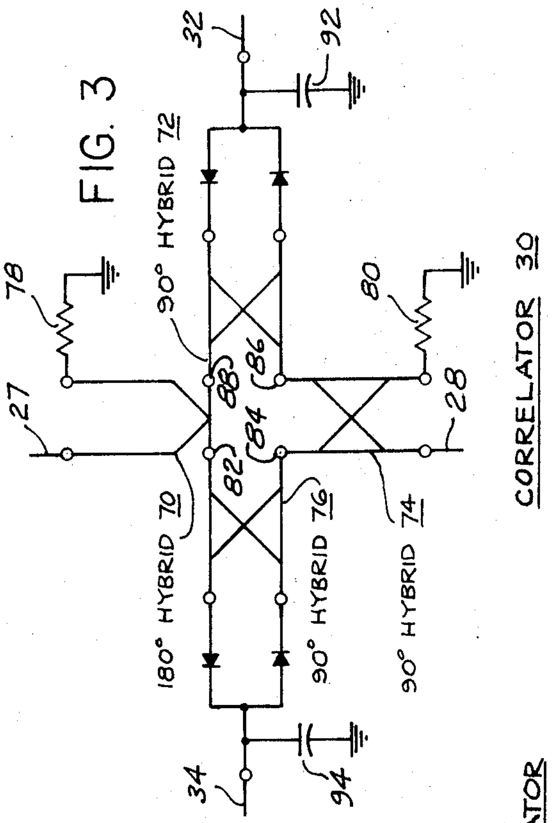
FIG. 3 is a schematic diagram of a correlator used for the demodulation of the four-phase modulated carrier signal.

Correlator 30 is shown in FIG. 3 utilizing 180° hybrid 70 and three 90° hybrids 72, 74 and 76. One input port of 180° hybrid 70 is connected to line 27 to receive the undelayed phase-modulated carrier signal while the other input port thereof is terminated with characteristic impedance 78. Similarly, one input port of 90° hybrid 74 is connected to line 28 to receive the delayed phase-modulated carrier signal while the other input port thereof is terminated by characteristic impedance 80. One output port of 180° hybrid 70 is connected via junction 82 to one input port of 90° hybrid 76, while the other input port of 180° hybrid 70 is connected via junction 88 to one input port of 90° hybrid 72. Similarly, one output port of 90° hybrid 74 is connected via junction 84 to the other input port of 90° hybrid 76 while the other output port of 90° hybrid 74 is connected via junction 86 to the other input port of 90° hybrid 72. The output ports of 90° hybrid 72 are connected in parallel via oppositely polarized diodes to the ungrounded terminal of filter capacitor 92 which is connected to line 32. The diodes and the capacitor 92 act as a full-wave rectifier. Similarly, the output ports of 90° hybrid 76 are connected in parallel via oppositely polarized diodes to the ungrounded terminal of filter capacitor 94 which is connected to line 34. Again, the diodes and capacitor 94 act as a full-wave rectifier. When a signal *a* is received on line 27 and a signal *b* is received on line 28, a signal $ab \cos\theta$ is transmitted on line 34 and a signal $ab \sin\theta$ is transmitted on line 32, where $\theta$ is the angular phase difference between signals *a* and *b*.

Figure 4:
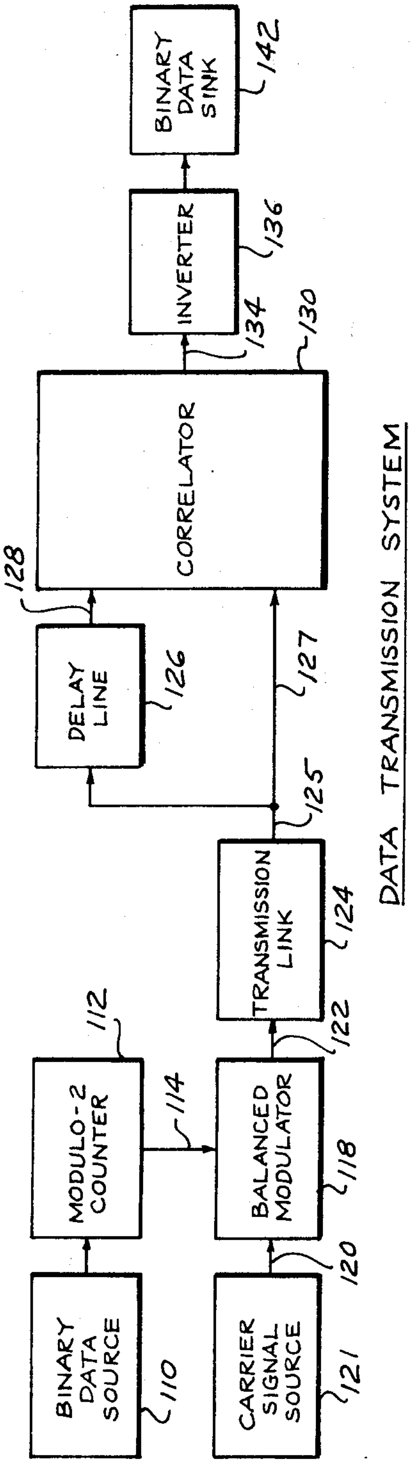
FIG. 4 is a block diagram of a data transmission system employing a two-phase modulated carrier signal.

In FIG. 4 a source of binary data 110 transmits a serial stream of binary data to a modulo-2 counter 112. The stream of binary data can be a sequence of combinations of pulse-no pulse signals in equal time slots representing respectively, binary 1 and 0. The modulo-2 counter can be a single binary counter. Such counter has two unique states and alternates between the states each time a binary 1 is received at its input. Accordingly, if the input data stream from data source 110 is 0,0,1,0,1,1,0,0,1,0,1 then the binary representations at the output of modulo-2 counter 112 are 0,0,1,1,0,1,1,1,0,0,1. It will be assumed that the binary digit 0 represents a low or negative voltage level and a binary digit 1 represents a high or positive voltage level.

The output of modulo-2 counter 112 is connected via line 114 to the modulating signal input of balanced modulator 118 which receives at its carrier signal input a carrier signal via line 120 from carrier signal source 121. Modulator 118 has the property of modulating the phase of the carrier signal to two discrete values 0° and 180° dependent on the polarity of the pulse received at its modulating signal input. When the modulating signal input is a 0 the phase is 0° and when the modulating signal input is a 1 the phase is 180°. Thus, when balanced modulator 118 serially receives from the modulo-2 counter 112 the following sequence of signals 0,0,1,1,0,1,1,1,0,0,1 the phase of the carrier signal sequentially assumes the following values 0°,0°,180°,180°,0°,180°,180°,180°,0°,0°,180°. The output of modulator 118 is fed via line 122 to transmission link 124 which can include transmitter output amplifiers connected via a transmission path to receiver input amplifiers.

The output 125 of transmission link 124 is to the receiver which senses for the phase differences between adjacent time slots of the phase-modulated carrier signal. The phase-difference sensing is accomplished by feeding the output 125 of transmission link 124, via line 127 to one input of correlator 130, and also via delay line 126 and line 128 to the second input of correlator 130. Delay line 126 introduces a delay equal to the period of one time slot.

Correlator 130 is a device which accepts two coherent RF signals *a* and *b* and provides an output voltage proportional to $ab \cos\theta$, where $\theta$ is the phase difference between the RF signals. Therefore, assuming the output 125 of transmission link 124 emits the following sequence of phases of carrier signal in sequential time states 0°,0°,180°,180°,0°,180°,180°,180°,0°,0°,180°; the phase differences presented to correlator 130 are 0°,0°,180°,0°,180°,180°,0° ,0°,180°,0°,180°. Since the output 134 of correlator is ab cos$\theta$, assuming the output voltage is normalized, then the output voltage pattern will be 1,1,0,1,0,0,1,1,0,1,0. After this voltage pattern passes through inverter 136 it becomes 0,0,1,0,1,1,0,0,1,0,1 and is fed to data sink 142. It should be noted that the data pattern received by data sink 142 is identical to that transmitted by data source 110. Data sink 142 can include a pulse shaping device such as a Schmitt trigger so that reliably shaped pulses are presented to the binary data processing circuits.

Although no initial synchronizing means have been shown, it should be apparent that any of the well known techniques presently used in binary data communication such as prearranged start codes and the like can be employed.

Figure 5:
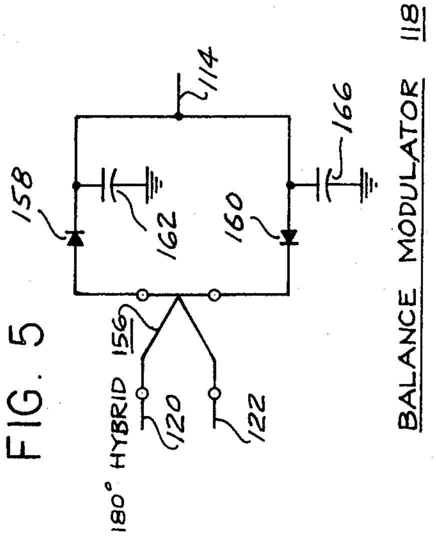
FIG. 5 is a schematic diagram of the balanced modulator of FIG. 4.

The balanced modulator 118 is shown in FIG. 5 centered around 180° hybrid 156 having one port connected to line 120 to receive the carrier signal and another port connected to line 122 to transmit the modulated carrier signal. The modulating signal input from line 114 is connected to each of the remaining two ports of hybrid 156 by oppositely polarized mixer diodes 158 and 160. Capacitors 162 and 166 are RF blocking capacitors.

Figure 6:
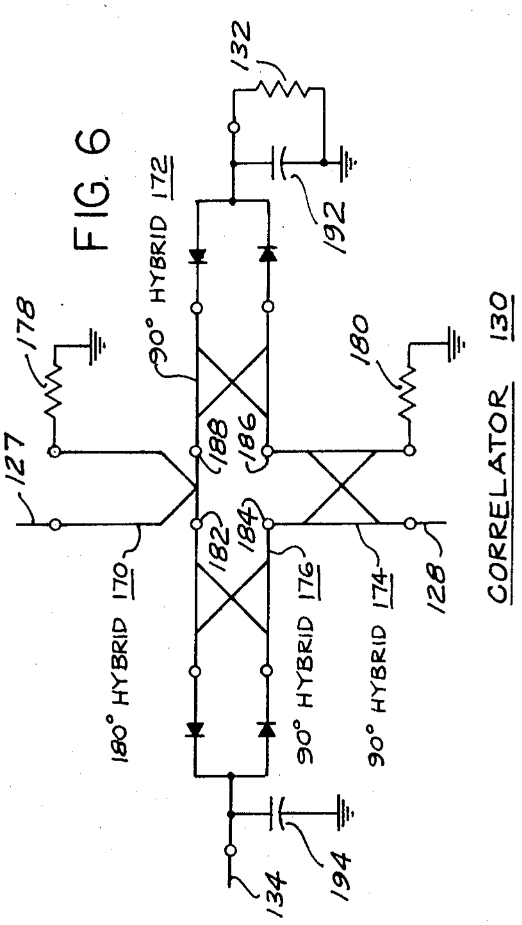
FIG. 6 is a schematic diagram of a correlator used for the demodulation of the two-phase modulated carrier signal.

Correlator 130 is shown in FIG. 6 utilizing 180° hybrid 170 and three 90° hybrids 172, 174 and 176. One input port of 180° hybrid 170 is connected to line 127 to receive the undelayed phase-modulated carrier signal while the other input port thereof is terminated with characteristic impedance 178. Similarly, one input port of 90° hybrid 174 is connected to line 128 to receive the delayed phase-modulated carrier signal while the other input port thereof is terminated by characteristic impedance 180. One output port of 180° hybrid 170 is connected via junction 182 to one input port of 90° hybrid 176, while the other output port of 180° hybrid 170 is connected via junction 188 to one input port of 90° hybrid 172. Similarly, one output port of 90° hybrid 74 is connected via junction 184 to the other input port of 90° hybrid while the other output port of 90° hybrid 174 is connected via junction 186 to the other input port of 90° hybrid 172. The output ports of 90° hybrid 72 are connected in parallel via oppositely polarized diodes to the ungrounded terminal of filter capacitor 192 which is connected to terminating resistor 132. Similarly, the output ports of 90° hybrid 176 are connected in parallel via oppositely polarized diodes to the ungrounded terminal of filter capacitor 194 which is connected to line 134. The diodes and capacitor 194 act as a full-wave rectifier. When a signal *a* is received on line 127 and a signal *b* is received on line 128, a signal $ab \cos\theta$ is transmitted on line 134 where $\theta$ is angular phase difference between signals *a* and *b*.

There has been shown improved methods and apparatus for transmitting binary coded data by phase modulating a carrier signal.

While only a limited number of embodiments have been shown and described in detail, there will now be apparent to those skilled in the art many modifications and variations satisfying many or all of the objects and which do not depart from the spirit thereof as defined by the appended claims.

What is claimed is:

1. A binary data demodulator wherein each unit binary data is represented by the phase of a multicycle packet of a phase-modulated carrier signal in a given time interval comprising: an input means for receiving the phase-modulated carrier signal; a signal delay means connected to said input means for delaying the received phase-modulated carrier signal for a period of time equal to said given time interval; a correlator means having two inputs which are connected to said input means and said signal delay means, respectively, and first and second outputs, said correlator means including means connecting the two inputs thereof to the two outputs thereof for transmitting from one of said outputs a signal proportional to the sine of the phase difference angle and from the other of said outputs a signal proportional to the cosine of the phase difference angle between the signals received at said two inputs; and means for combining the signal from the first output of said correlator means with the inverse of the signal from the second output of said correlator means.

* * * * *